Nov. 25, 1952 — R. P. SHADE — 2,619,288
HEATING SYSTEM
Filed Aug. 5, 1949 — 2 SHEETS—SHEET 1

INVENTOR:
Robert Paul Shade,
BY Dawson, Ooms, Booth and Spangenberg,
ATTORNEYS.

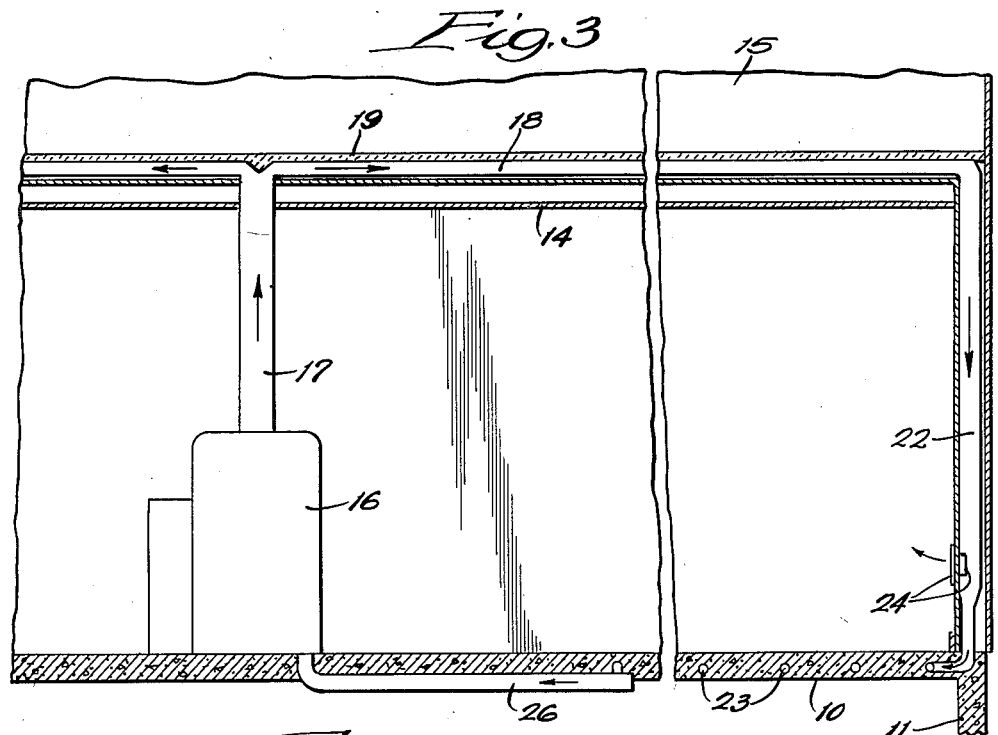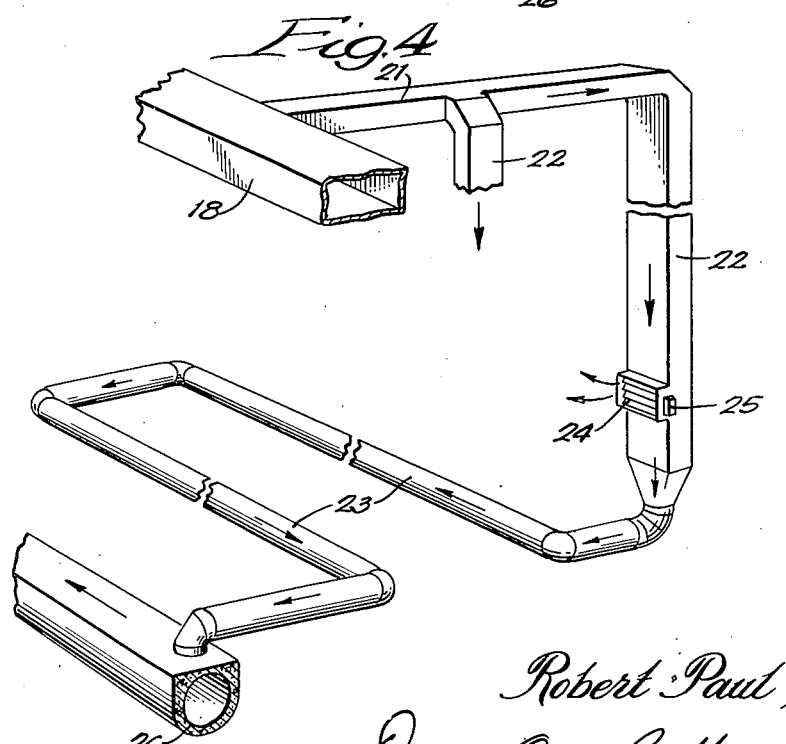

Patented Nov. 25, 1952

2,619,288

UNITED STATES PATENT OFFICE 2,619,288

HEATING SYSTEM

Robert Paul Shade, Evanston, Ill.

Application August 5, 1949, Serial No. 108,696

7 Claims. (Cl. 237—2)

This invention relates to heating systems and more particularly to heating systems for heating single story residences.

Residences of the single story type have heretofore been heated by so called radiant heating systems in which the floors, walls, or ceilings are heated to radiate heat into the living space. I have heretofore proposed in connecting with heating systems of this general type the use of air as a heat circulating medium, the air flowing through conduits embedded in the floor of the building to heat it. The present invention relates to heating systems of this general type using air as a heat circulating medium, although certain features of the invention are applicable to systems employing liquid circulating mediums.

One of the objects of the invention is to provide a heating system in which dual circulation is provided in the floor, one circuit comprising a single loop adjacent the periphery of the space and the second comprising a circuitous or multiple loop path within the single loop. With this construction the first circuit supplies maximum heat adjacent the periphery of the space where it is most needed so that the entire space is heated uniformly.

Another object is to provide a heating system in which the supply of heated air is overhead and the return is through conduits in the floor. This arrangement provides maximum space economy and an extremely even distribution of heat throughout the space.

Still another object is to provide a heating system in which heated air may be supplied to desired portions of the building in addition to the radiant heating effect. Preferably, the air is admitted into the interior of the building through individual registers controlled by separate thermostats. This construction further enables the system to be used for summer cooling or ventilation.

The above and other objects and advantages of the invention will be more readily apparent when read in connection with the accompanying drawings, in which—

Figure 3 is a vertical diagrammatic section; and

Figure 4 is a perspective view illustrating the heat distribution system.

Figure 1:
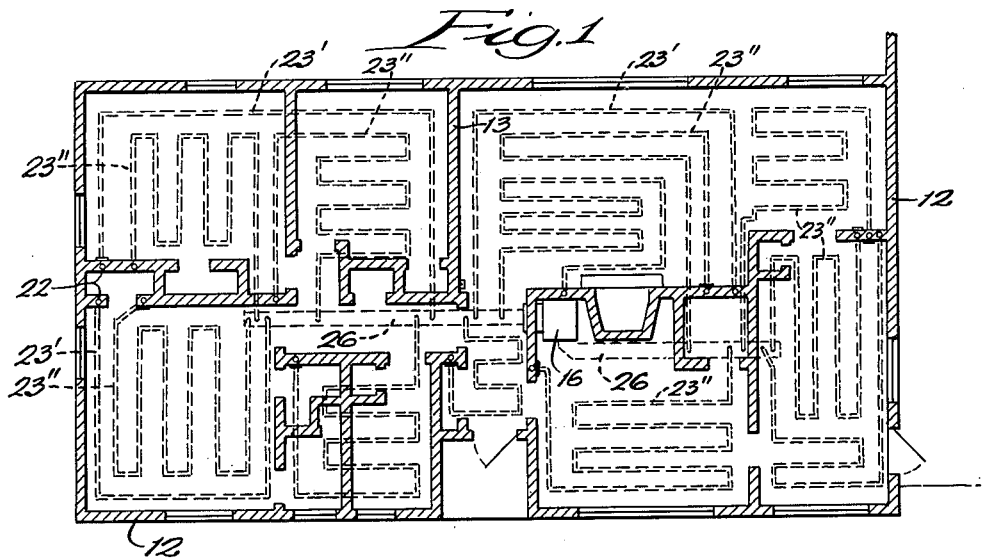
Figure 1 is a diagrammatic floor plan of a typical residence equipped with a heating system embodying the invention.

As shown in the drawings, the heating system is applied to a single story residence without a basement, although it is not limited to this exact type of structure. The residence shown has a cement floor 10 which may be poured over a sub-floor of cinders, gravel, stone or the like and which terminates in a foundation 11 at its periphery. The building is enclosed by vertical outer walls 12 which may be provided with the usual window and door openings as required and its interior is divided into a plurality of separate rooms by interior vertical walls 13. It will be understood that any desired arrangement of the walls can be utilized to produce the desired residence design. The living space is covered by a ceiling 14 above which there may be a relatively small attic space 15 enclosed by the roof.

Figure 2:
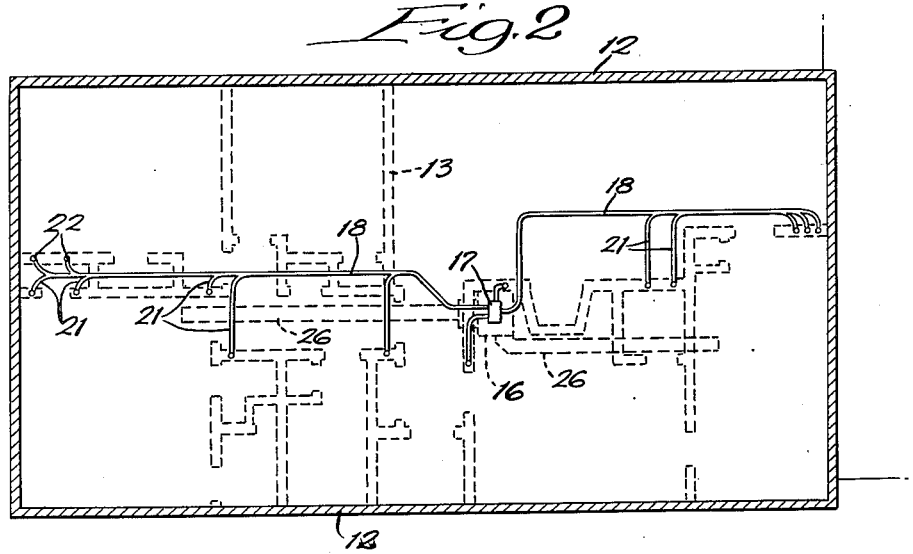
Figure 2 is an attic plan of the same residence.

Heat is supplied for the dwelling by an air heating and circulating unit 16 which may be any desired type of furnace preferably equipped with a circulating blower or fan. With the present system the furnace may also include a cooling unit, if desired. Heated air from the furnace flows upwardly through a vertical supply duct 17 into one or more horizontal headers 18 arranged above the ceiling in the attic space. The duct and headers may be formed of any desired material such, for example, as the usual metal duct work and are preferably insulated as indicated at 19 in Figure 3. The headers 18, as shown in Figure 2, may extend generally longitudinally of the housing and may have branch ducts 21 extending therefrom to desired points in the inner partition walls 13.

As best seen in Figures 3 and 4, the branch ducts 21 lead to vertical branch supply ducts 22 located in the walls 13 and leading to conduits 23 embedded in the floor 10. The vertical branch supply ducts 22 may also be the usual metal ducts and the conduits 23 which are embedded in the floor may be formed in any desired manner of metal pipe, tile, concrete pipe, or the like. It will be noted in this connection that when air is used as a circulating medium leakage does not present a problem since any seepage of air into the space cannot cause any damage and any loss of air from the system is not serious. Therefore, the conduits 23 may be formed inexpensively and will function efficiently.

According to one feature of the invention as illustrated in Figure 1, the floor space is segregated into separate areas each of which is separately heated by its own conduit system. For example, the room at the lower left of Figure 1 is provided with one conduit 23' extending from a vertical branch supply duct 22 in a single loop around the periphery of the room. A second conduit system 23" extends in a circuitous path comprising a series of uniformly spaced loops within the single loop 23'. Other portions of the space are similarly provided with a single outer loop extending adjacent to the periphery of the building within which there is a second circuit including a series of uniformly spaced loops. With this construction the single outer loop provides a shorter path for the travel of air than the inner multiple loop circuit so that a relatively greater quantity of air will flow therethrough to raise the temperature of the floor at its periphery to a slightly higher degree than the inner floor areas. The single outer loop, therefore, functions as a chill breaker circuit providing maximum heat at the periphery of the building where it is most needed so that the overall effect is to heat the entire space uniformly throughout. It will be noted that this feature of the invention could be employed with systems utilizing liquid as the heat circulating medium. It will further be noted that the conduits 23 are distributed throughout the entire dwelling space in the manner required to heat the space uniformly, the exact disposition of the conduits varying with different dwelling designs in accordance with the heating requirements thereof.

According to another important feature of the invention provisions are made for circulation of heated air through the various rooms of the residence as required to compensate for extreme conditions such as high winds or the like. As shown in Figures 3 and 4, this is accomplished by providing air registers 24 in the vertical branch conduits 22 opening into the various rooms of the dwelling. The registers are of the controllable type and each one is equipped with a thermostat 25 responsive to the temperature in the room into which the register opens to control opening and closing of the registers.

Under normal conditions the registers will remain closed, but in the event the temperature in any room should fall, the register or registers in that room will open to admit heated air directly to the room in addition to circulation of heated air through the floor conduits. Furthermore, if it is desired to use the system for summer cooling or summer ventilation, the thermostats can be set to open the registers so that cool air can be circulated through them and through the several rooms, as desired. Air discharged from the registers may return directly through the rooms of the dwelling through the heating unit or through a common return duct centrally located in the dwelling to the heating unit. The air flowing through the conduits 23 is returned to the heating unit by one or more return headers 26 located below the floor and below the level of the conduits 23. As shown in Figure 4, the return headers may be concrete pipe embedded in the sub-floor or in the concrete floor itself, although any desired type of conduits could be employed.

While one embodiment of the invention has been shown and described in detail herein, it will be understood that this is illustrative only and is not to be taken as a definition of the scope of the invention, reference being had for this purpose to the appended claims.

What is claimed is:

1. A heating system for a building having a floor, walls and ceiling comprising a fluid heating and circulating unit, fluid supply and return headers connected to the unit, a conduit in the floor connecting the supply and return headers and extending in a single loop adjacent to the periphery of the building, and a second conduit in the floor connecting the supply and return headers and defining a circuitous path within the single loop.

2. A heating system for a building having a floor, walls and ceiling comprising a fluid heating and circulating unit, fluid supply and return headers connected to the unit, a series of conduits in the floor connecting the supply and return headers and extending in adjacent single loops adjacent to the periphery of the building, and a second series of conduits in the floor connecting the supply and return headers and extending in circuitous paths substantially uniformly throughout the area within said single loops.

3. A heating system for a building having a floor, walls and a ceiling comprising a fluid heating and circulating unit, a supply header connected to said unit and lying above the ceiling, a return header connected to the unit and lying below the floor, branch supply ducts connected to the supply header and extending down through the walls into the floor, a conduit in the floor connecting one of the supply ducts to the return header and extending in a single loop adjacent to the periphery of the building, and a second conduit in the floor connecting another of the supply ducts to the return header and extending in a series of loops within the single loop.

4. A heating system for a building having a floor, walls and a ceiling comprising an air heating and circulating unit, a supply header above the ceiling connected to the unit to receive heated air therefrom, branch supply ducts connected to the header and extending down through the walls into the floor, conduits in the floor connecting the branch supply ducts to the unit to return air thereto, and registers in the branch supply ducts to discharge heated air therefrom into the interior of the building.

5. A heating system for a building having a floor, walls and a ceiling comprising an air heating and circulating unit, a supply header above the ceiling connected to the unit to receive heated air therefrom, branch supply ducts connected to the header and extending down through the walls into the floor, conduits in the floor connecting the branch supply ducts to the unit to return air thereto, registers in the branch supply ducts to discharge heated air therefrom into the interior of the building, and thermostats responsive to the temperature within the building to control the registers.

6. A heating system for a building having a floor, walls and a ceiling comprising an air heating and circulating unit, a supply header above the ceiling connected to the unit to receive heated air therefrom, branch supply ducts connected to the header and extending down through the walls into the floor, a return header beneath the floor connected to the unit, a conduit in the floor connecting one of the supply ducts to the return header and extending in a single loop adjacent to the periphery of the building, a second conduit in the floor connecting another of the supply ducts to the return header and extending in a series of substantially uniformly spaced loops within the single loop, and registers in the branch supply ducts to discharge heated air therefrom into the interior of the building.

7. A heating system for a building having a floor, walls and a ceiling comprising an air heating and circulating unit, a supply header above the ceiling connected to the unit to receive heated air therefrom, branch supply ducts connected to the header and extending down through the walls into the floor, a return header beneath the floor connected to the unit, a conduit in the floor connecting one of the supply ducts to the return header and extending in a single loop adjacent to the periphery of the building, a second conduit in the floor connecting another of the supply ducts to the return header and extending in a series of substantially uniformly spaced loops within the single loop, and registers in the branch supply ducts to discharge heated air therefrom into the interior of the building, each of the registers including a thermostat responsive to the temperature at an adjacent point in the building to control the register.

ROBERT PAUL SHADE.

REFERENCES CITED

The following references are of record in the file of this patent:

UNITED STATES PATENTS

| Number | Name | Date |
| --- | --- | --- |
| 795,772 | Janney | July 25, 1905 |
| 1,193,271 | Kuntz | Aug. 1, 1916 |
| 2,465,184 | Alderman | Mar. 22, 1949 |
| 2,487,367 | Peple | Nov. 8, 1949 |
| 2,523,499 | Copping | Sept. 26, 1950 |

OTHER REFERENCES

"Radiant Heating," by Adlam, pp. 84, 85, copyright 1947.